(12) United States Patent
Chen et al.

(10) Patent No.: US 11,249,572 B2
(45) Date of Patent: Feb. 15, 2022

(54) TOUCH PANEL

(71) Applicant: Cambrios Film Solutions Corporation, Tortola (VG)

(72) Inventors: Shih-Ching Chen, New Taipei (TW); Wei-Chia Fang, Zhubei (TW); Chun-Hung Chu, Hsinchu (TW); Chung-Chin Hsiao, Zhubei (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 16/941,662

(22) Filed: Jul. 29, 2020

(65) Prior Publication Data

US 2021/0357054 A1 Nov. 18, 2021

(30) Foreign Application Priority Data

May 14, 2020 (CN) .......................... 202010408873.1

(51) Int. Cl.
*G06F 3/041* (2006.01)

(52) U.S. Cl.
CPC ........ *G06F 3/0412* (2013.01); *G06F 3/04164* (2019.05); *G06F 2203/04102* (2013.01); *G06F 2203/04103* (2013.01)

(58) Field of Classification Search
CPC ............... G06F 3/0412; G06F 3/04164; G06F 2203/04102; G06F 2203/04103
USPC ........................................................ 345/173
See application file for complete search history.

(56) References Cited

U.S. PATENT DOCUMENTS

| 10,216,304 | B2 | 2/2019 | Huang | |
|---|---|---|---|---|
| 2013/0194759 | A1* | 8/2013 | Kang | G06F 3/0445 |
| | | | | 361/748 |
| 2016/0124550 | A1* | 5/2016 | Tada | H05K 1/0289 |
| | | | | 345/173 |
| 2018/0046283 | A1* | 2/2018 | Yoshida | G06F 3/0446 |
| 2020/0097113 | A1* | 3/2020 | Fang | G06F 3/0443 |
| 2020/0150807 | A1* | 5/2020 | Miyashita | G06F 3/0412 |

FOREIGN PATENT DOCUMENTS

| CN | 207882614 U | 9/2018 |
|---|---|---|
| TW | 201512918 A | 4/2015 |
| TW | M604005 U | 11/2020 |

\* cited by examiner

*Primary Examiner* — Mark Edwards
(74) *Attorney, Agent, or Firm* — Cooper Legal Group, LLC

(57) ABSTRACT

A touch panel is provided, including a substrate, a first wire structure, and a second wire structure. The substrate includes a display area and a peripheral area surrounding the display area. The first wire structure includes a first catalyst layer, a first metal layer, and a first transparent conductive layer. The first catalyst layer is disposed above the peripheral area, the first metal layer is disposed above the first catalyst, and the first transparent conductive layer is disposed above the first metal layer. The first wire structure is divided into at least one first wire area and at least one first ground line area adjacent to the first wire area. The second wire structure is disposed under the peripheral area and includes at least one second ground line area, wherein a projection of the first wire area in a vertical direction is opposite to the second ground line area.

20 Claims, 10 Drawing Sheets

TOUCH PANEL

CROSS-REFERENCE TO RELATED APPLICATION

This application claims priority to China Application Serial Number 202010408873.1, filed on May 14, 2020, which is herein incorporated by reference in its entirety.

BACKGROUND

Field of Disclosure

The present disclosure relates to a touch panel. More particularly, the present disclosure relates to a touch panel having a catalyst layer and a wire area opposite to a ground line area.

Description of Related Art

In traditional touch panels, the entire surface of the substrate is coated with a conductive layer, and then unnecessary portions of the conductive layer are removed by dry etching or wet etching processes to form a circuit pattern.

However, regardless of the dry etching or wet etching process, the process time is long and the process steps are numerous. Even with a thinly coated substrate, the time and process steps cannot be reduced. Furthermore, because the cost of targets or coatings is high and coating the substrate in large areas is required in the traditional processes, it is hard to reduce costs. In addition, if the conductive lines in the X-axis direction and the Y-axis direction overlap, signals may interfere with each other, resulting in an inaccurate touch position. Therefore, the traditional technology still needs to be improved.

SUMMARY

One purpose of an embodiment of the present disclosure is to provide a touch panel that can solve the above problems.

In order to achieve the above purpose, the present disclosure provides a touch panel comprising a substrate, a first wire structure, and a second wire structure. The substrate comprises a first display area and a first peripheral area, wherein the first display area is surrounded by the first peripheral area. The first wire structure comprises a first catalyst layer, a first metal layer, and a first transparent conductive layer. The first catalyst layer is disposed above the first peripheral area of the substrate. The first metal layer is disposed above the first catalyst layer. The first transparent conductive layer is disposed above the first metal layer, wherein the first wire structure is divided into at least one first wire area and at least one first ground line area adjacent to the first wire area. The second wire structure is disposed beneath the first peripheral area of the substrate, the second wire structure comprises at least one second ground line area, wherein a projection of the first wire area in a vertical direction is opposite to the second ground line area.

In one embodiment, the first wire structure is divided into one first wire area and two first ground line areas, and the first wire area is between the two first ground line areas.

In one embodiment, the second wire structure further comprises a second catalyst layer, a second metal layer, and a second transparent conductive layer. The second catalyst layer is disposed beneath the first peripheral area of the substrate. The second metal layer is disposed beneath the second catalyst layer. The second transparent conductive layer is disposed beneath the second metal layer, wherein the second wire structure is divided into at least one second wire area and at least one second ground line area adjacent to the second wire area.

In one embodiment, a projection of the second wire area in the vertical direction is opposite to the first ground line area.

In one embodiment, the second wire structure is divided into one second wire area and two second ground line areas, and the second wire area is between the two second ground line areas.

In one embodiment, the first catalyst layer and the second catalyst layer have different patterns.

In one embodiment, the second wire structure further comprises a lower substrate, a second catalyst layer, a second metal layer, and a second transparent conductive layer. The lower substrate is disposed beneath the substrate, and the lower substrate comprises a second display area and a second peripheral area. The second display area is surrounded by the second peripheral area. A projection of the second display area in the vertical direction is opposite to the first display area, and a projection of the second peripheral area in the vertical direction is opposite to the first peripheral area. The second catalyst layer is disposed above the second peripheral area of the lower substrate. The second metal layer is disposed above the second catalyst layer. The second transparent conductive layer is disposed above the second metal layer, wherein the second wire structure is divided into at least one second wire area and at least one second ground line area adjacent to the second wire area.

In one embodiment, a projection of the second wire area in the vertical direction is opposite to the first ground line area.

In one embodiment, the second wire structure is divided into one second wire area and two second ground line areas, and the second wire area is between the two second ground line areas.

In one embodiment, the substrate further comprises a bonding area connected to a side on the first peripheral area, wherein a projection of the first wire area in the vertical direction is opposite to the second wire area when the first wire area and the second wire area are located in the bonding area.

In one embodiment, the substrate further comprises a bonding area connected to a side on the first peripheral area, wherein a projection of the first wire area in the vertical direction is not opposite to the second wire area when the first wire area and the second wire area are located in the bonding area.

In one embodiment, the touch panel is prepared by full-plate printing or patterned printing process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides a detailed description of many different embodiments, or examples, for implementing different features of the provided subject matter. These are, of course, merely examples and are not intended to limit the invention but to illustrate it. In addition, various embodiments disclosed below may combine or substitute one embodiment with another, and may have additional embodiments in addition to those described below in a beneficial way without further description or explanation. In the following description, many specific details are set forth to provide a more thorough understanding of the present disclosure. It will be apparent, however, to those skilled in the art, that the present disclosure may be practiced without these specific details.

Further, spatially relative terms, such as "beneath," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

A number of examples are provided herein to elaborate upon the touch panel of the instant disclosure. However, the examples are for demonstration purpose alone, and the instant disclosure is not limited thereto.

Figure 1:
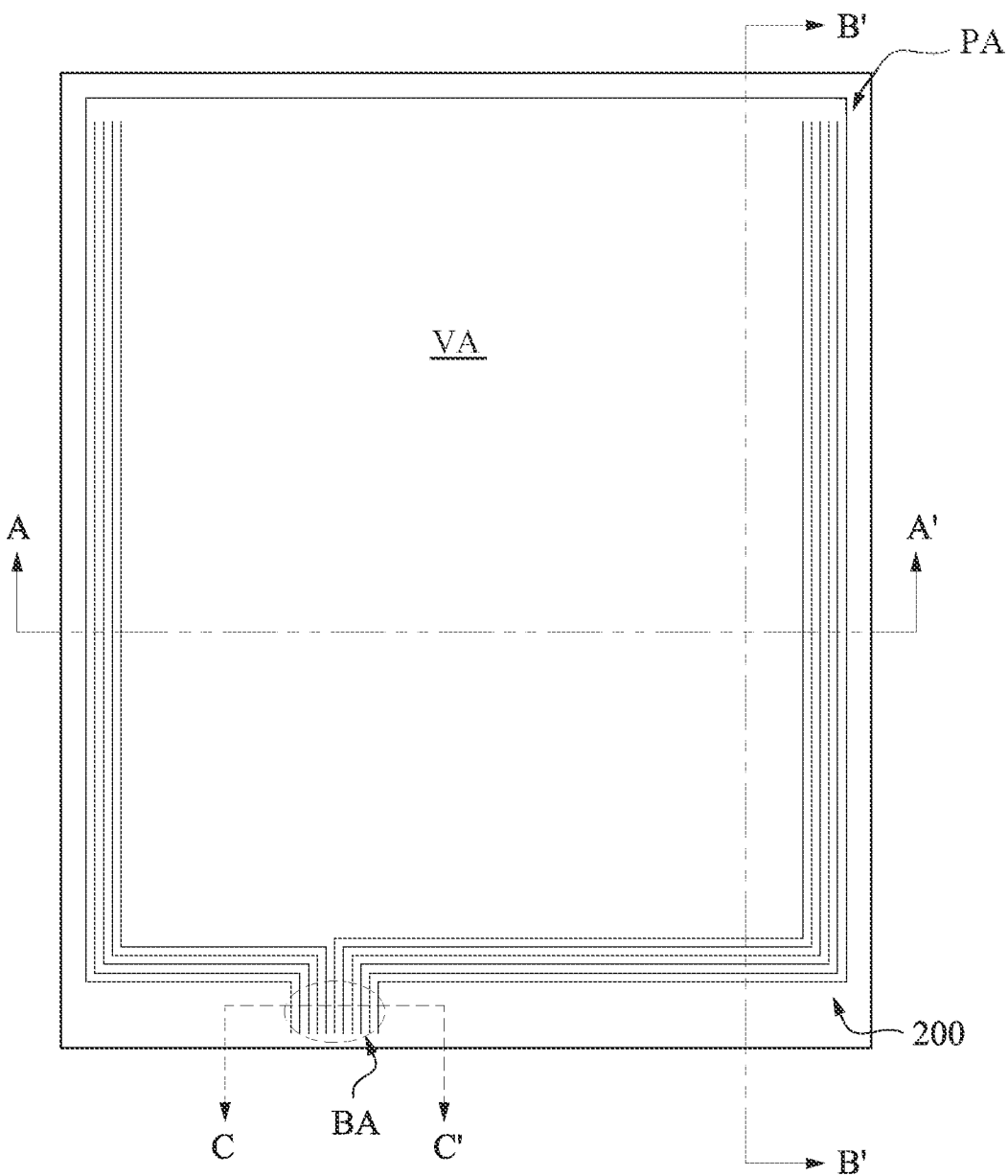
FIG. 1 depicts a front view of a touch panel according to an embodiment of the present disclosure.
Figure 2:
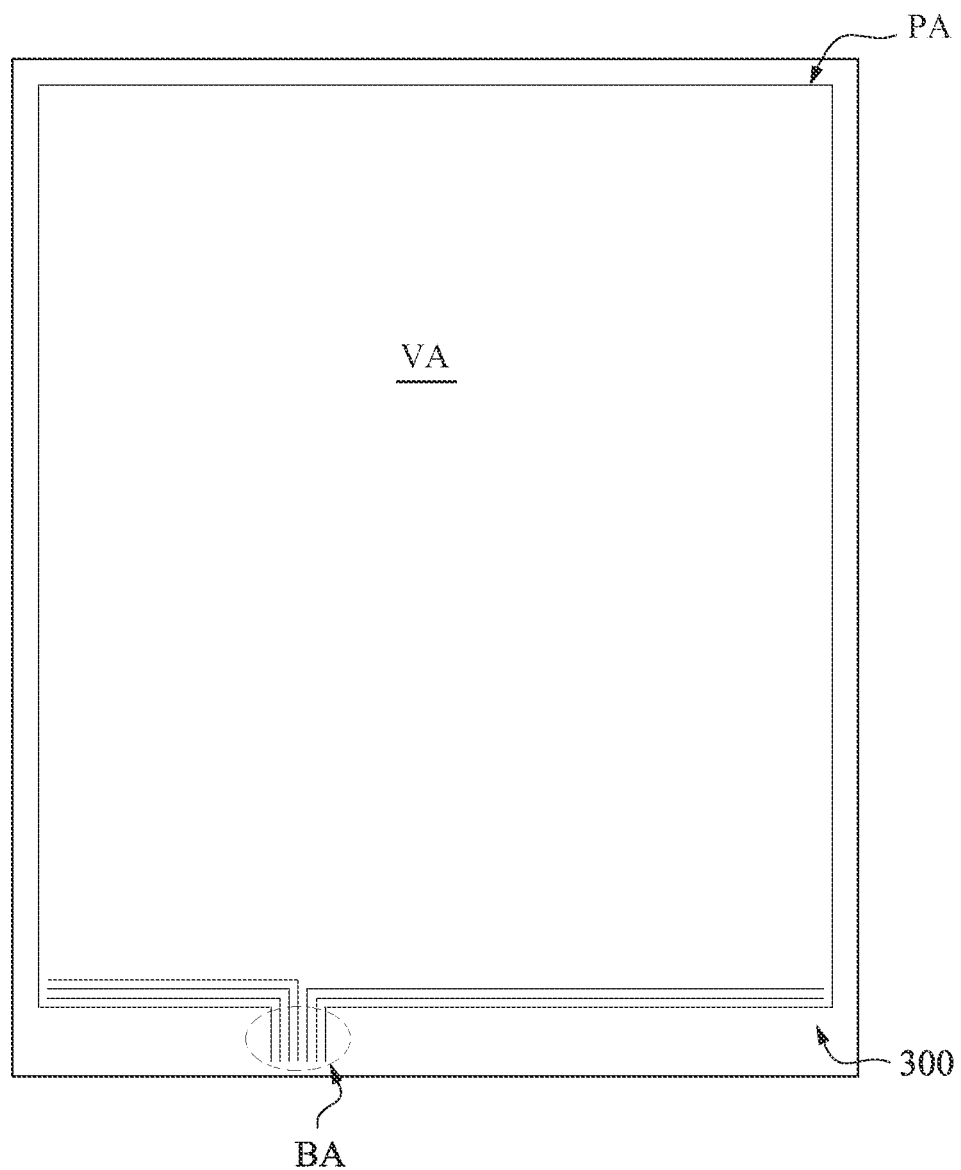
FIG. 2 depicts a mirror view of a back view of the touch panel according to an embodiment of the present disclosure.

One embodiment of the present disclosure provides a touch panel. The process time can be shortened and the process steps can be reduced by the structure of a catalyst layer. The present disclosure also improves the accuracy of the touch point by using wire areas and grounding areas opposite to each other. FIG. 1 depicts a front view of a touch panel 10 according to an embodiment of the present disclosure, and FIG. 2 depicts a mirror view of a back view of the touch panel 10 according to an embodiment of the present disclosure to understand the relative position of the upper and lower wire layers. One embodiment of the present disclosure provides a touch panel 10 including a substrate 100, a first wire structure 200, and a second wire structure 300.

The substrate 100 includes a display area VA, a peripheral area PA, and a bonding area BA. The display area VA is surrounded by the peripheral area PA, and the bonding area BA is connected to a side of the peripheral area PA. In one embodiment, the display area VA is located at a center of the substrate 100, which can be used as a location for touch sensing electrodes (not shown). In one embodiment, the peripheral area PA is located at a peripheral of the substrate 100, which can be used as a location for touch sensing electrode wires (not shown). The peripheral area PA is disposed beside a side of the display area VA. For example, the peripheral area PA can be disposed around a frame area (including left side, right side, upper side, and lower side) of the display area VA. But in the other examples, the peripheral area PA can be disposed beside an L-shaped area including the left side and the lower side. In one embodiment, the bonding area BA is where the peripheral area PA controls and exports the touch sensing electrode wires and is coupled to a flexible circuit board (not shown) to transmit signals to a display control circuit and a touch control circuit (not shown).

In one embodiment, a material of the substrate 100 is transparent or opaque. Suitable rigid substrates include, but are not limited to, polycarbonate, acrylic, and the like. Suitable flexible substrates include, but are not limited to, polyesters (e.g., polyethylene terephthalate (PET), polyethylene naphthalate, and polycarbonate), polyolefins (e.g., linear, branched, and cyclic polyolefins), polyethylene (e.g., polyvinyl chloride, polyvinylidene chloride, polyvinyl acetal, polystyrene, polyacrylate, and the like), cellulose ester substrates (e.g., triacetate fiber cellulose and cellulose acetate), polysulfone (e.g. polyethersulfone), polyimide, polysiloxane, and other conventional polymer films. Other examples of suitable substrates can be found in, for example, U.S. Pat. No. 6,975,067. The thickness of substrate 100 is from 15 μm to 150 μm.

Figure 3:
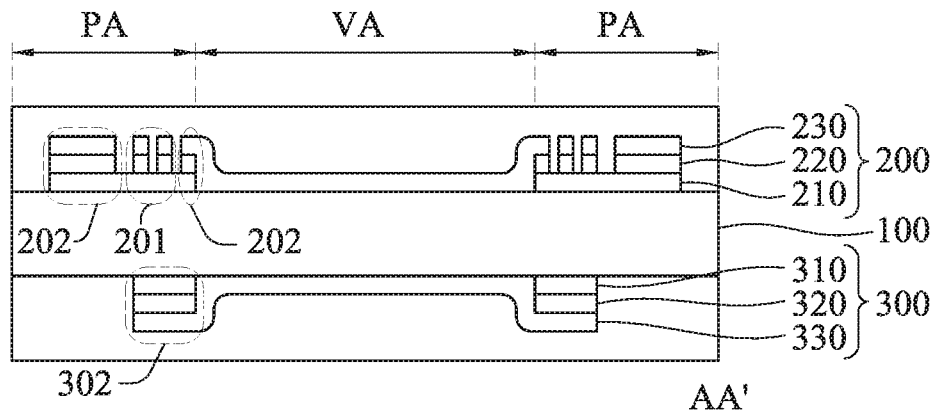
FIG. 3 depicts a cross-sectional view of line AA' of FIG. 1.
Figure 4:
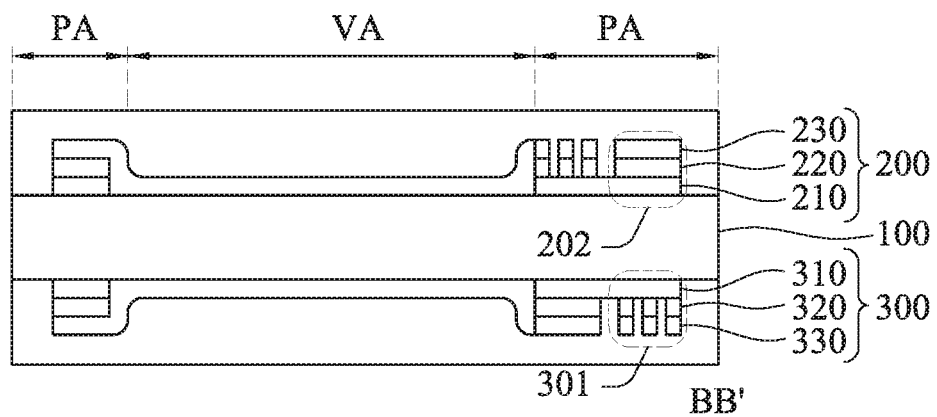
FIG. 4 depicts a cross-sectional view of line BB' of FIG. 1.

FIG. 3 depicts a cross-sectional view of line AA' of FIG. 1, and FIG. 4 depicts a cross-sectional view of line BB' of FIG. 1. In one embodiment, the first wire structure 200 is a wire structure connected to the first electrode (not shown), and the second wire structure 300 is a wire structure connected to the second electrode (not shown). In an example, the first and second electrodes can be an X-axis electrode and a Y-axis electrode or a Y-axis electrode and an X-axis electrode, respectively.

The first wire structure 200 includes a first catalyst layer 210, a first metal layer 220, and a first transparent conductive layer 230. The first catalyst layer 210 is disposed on the peripheral area PA of the substrate 100. The material of the first catalyst layer 210 is ink or photoresist material containing conductive metals such as palladium or silver. For example, the conductive metals may include silver nanowire (SNW), carbon nanotube (CNT), indium tin oxide (ITO), conductive polymers (e.g., poly(3,4-ethylenedioxythiophene) polystyrene sulfonate (PEDOT:PSS)), graphite (e.g., graphene), etc. The first metal layer 220 is disposed on the first catalyst layer 210. The material of first metal layer 220 is copper (Cu), copper-nickel alloy (Cu—Ni), copper-palladium alloy (Cu—Pd), silver (Ag), silver-nickel alloy (Ag—Ni), silver-palladium alloy (Ag—Pd), etc. The viscosity of the first catalyst layer 210 is about 100 cp to 5000 cp, and the solid content is about 10% to 100% vol. % or 10% to 100% wt. %. The printing width of the first catalyst layer 210 can range from 2 µm to 50 mm, and the printing thickness can range from 100 nm to 10 µm. The first transparent conductive layer 230 is disposed on the first metal layer 220. In one embodiment, the first transparent conductive layer 230 is a transparent conductive material. In one example, the first transparent conductive layer 230 is a transparent conductive material including metallic silver, such as silver nanowires or silver nano particles.

In one embodiment, the first wire structure 200 undergoes a photolithographic process to pattern the first metal layer 220 and the first transparent conductive layer 230. Therefore, the first wire structure 200 is divided into at least one first wire area 201 and at least one first ground line area 202 adjacent to the first wire area 201. In one example, the first wire structure 200 is divided into one first wire area 201 and two first ground line areas 202, and the first wire area 201 is between these two first ground line areas 202. That is, the two first ground line areas 202 are respectively located at two opposite sides of the first wire area 201. In one example, the width of the first wire area 201 is about 10 µm to about 50 µm, for example, about 15 µm, about 20 µm, about 25 µm, about 30 µm, about 35 µm, about 40 µm, about 45 µm, or any value between any two of these values. In one embodiment, the first wire area 201 has a plurality of wires, wherein the width of each wire is greater than 1 µm, for example, about 1.2 µm, about 1.4 µm, about 1.6 µm, about 1.8 µm, about 2 µm, or any value between any two of these values.

The second wire structure 300 includes a second catalyst layer 310, a second metal layer 320, and a second transparent conductive layer 330. The second catalyst layer 310 is disposed under the peripheral area PA of the substrate 100. In detail, the peripheral area PA of the substrate 100 has two opposite surfaces, wherein the first catalyst layer 210 is disposed on an upper surface, and the second catalyst layer 310 is disposed on a lower surface. In detail, the peripheral area PA of the substrate 100 has two opposite surfaces, wherein the first catalyst layer 210 is disposed on an upper surface, and the second catalyst layer 310 is disposed on a lower surface. The material of the second catalyst layer 310 is ink or photoresist material containing conductive metals such as palladium and silver. For example, the conductive metals may include silver nanowire (SNW), carbon nanotube (CNT), indium tin oxide (ITO), conductive polymers (e.g., PEDOT:PSS), graphite (e.g., graphene), etc. The second metal layer 320 is disposed under the second catalyst layer 310. The material of the second metal layer 320 is copper (Cu), copper-nickel alloy (Cu—Ni), copper-palladium alloy (Cu—Pd), silver (Ag), silver-nickel alloy (Ag—Ni), silver-palladium alloy (Ag—Pd), etc. The viscosity of the second catalyst layer 310 is about 100 cp to 5000 cp, and the solid content is about 10% to 100% vol. % or 10% to 100% wt. %. The printing width of the second catalyst layer 310 can range from 2 µm and 50 mm, and the printing thickness can range from 100 nm and 10 µm. The second transparent conductive layer 330 is disposed under the second metal layer 320. In one embodiment, the second transparent conductive layer 330 is a transparent conductive material. In one example, the second transparent conductive layer 330 is a transparent conductive material including metallic silver, such as silver nanowires or silver nano particles. In one embodiment, the first catalyst layer 210 and the second catalyst layer 310 have different patterns.

In one embodiment, the second wire structure 300 undergoes a photolithographic process to pattern the second metal layer 320 and the second transparent conductive layer 330. Therefore, the second wire structure 300 is divided into at least one second wire area 301 and at least one second ground line area 302 adjacent to the second wire area 301. In one example, the width of the second wire area 301 is about 10 µm to 50 µm. In one example, the second wire area 301 has a plurality of wires, and the width of each wire is greater than 1 µm.

In one embodiment, as shown in FIG. 3 depicting a cross-sectional view of the line AA' in FIG. 1, a projection of the first wire area 201 in a vertical direction is opposite to the second ground line area 302. In one embodiment, as shown in FIG. 4 depicting the cross-sectional view of the line BB' of FIG. 1, a projection of the first ground line area 202 in the vertical direction is opposite to the second wire area 301 at the right side of FIG. 4, which is also at the lower side of the touch panel 10 in FIG. 1. Regarding the design of the wire areas, the wire areas and grounding line areas opposite to each other can avoid the signal interference generated by two wire areas opposite to each other, which will cause the finger touch site to be different from the actual reaction site, so as to improve the touch point accuracy. As for the design of the ground line areas, it is not limited to the ground line areas being only opposite to the wire areas. For example, on the left side of FIG. 4, which is also at the upper side of the touch panel 10 in FIG. 1, a projection of the first ground line area 202 in the vertical direction is opposite to the second ground line area 302.

Figure 5:
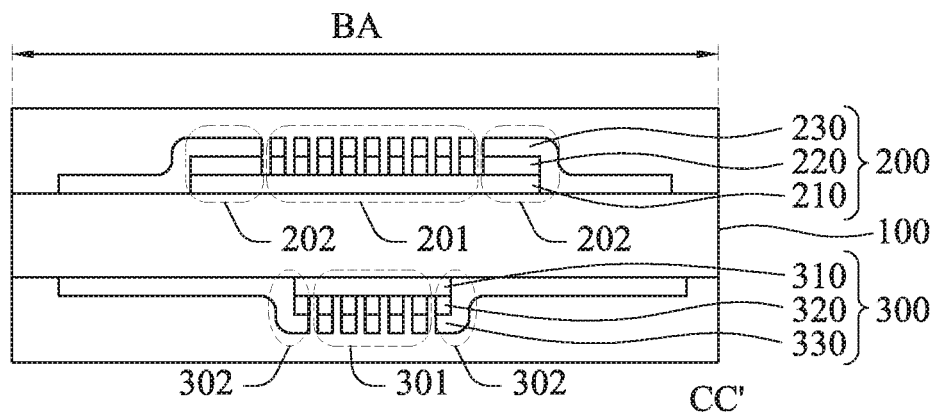
FIG. 5 depicts a cross-sectional view of line CC' of FIG. 1.

FIG. 5 depicts a cross-sectional view of line CC' of FIG. 1. The first wire area 201 and the second wire area 301 are located in the bonding area BA, and a projection of the first wire area 201 in the vertical direction is opposite to the second wire area 301. In other words, the wire area does not need to be opposite to the ground line area in the bonding area BA.

Figure 6:
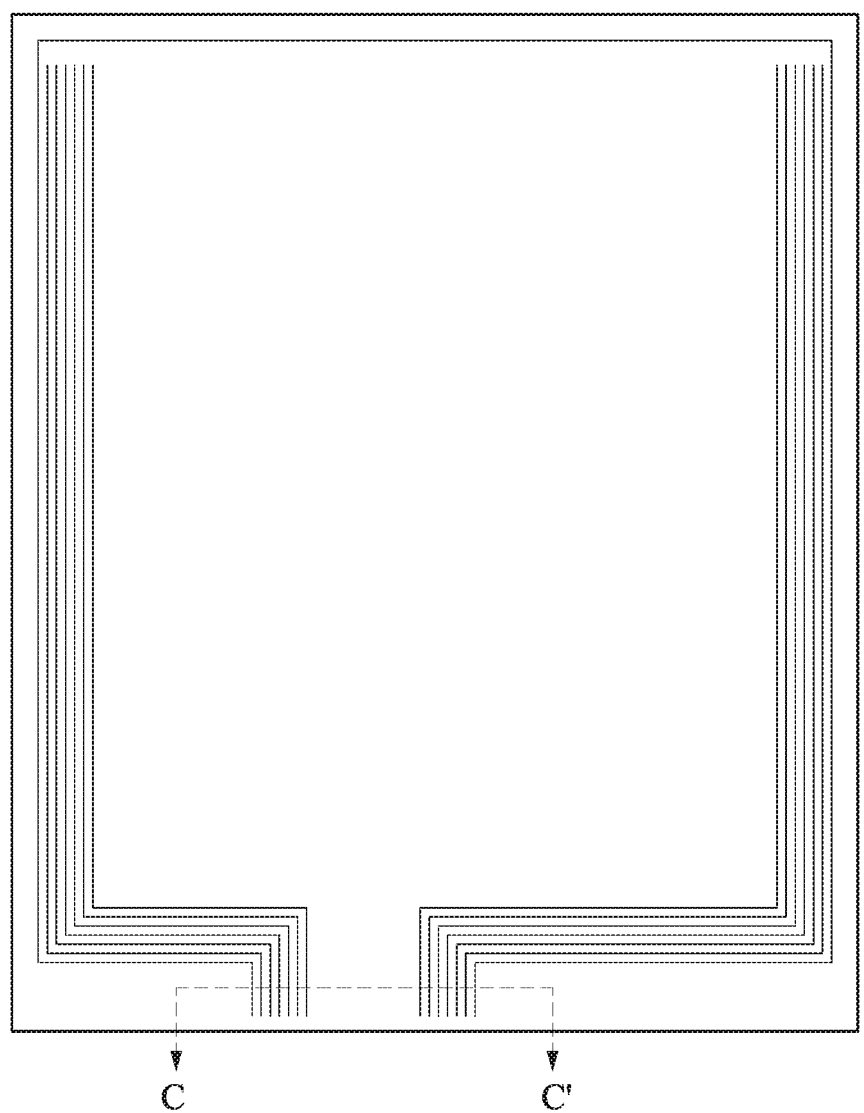
FIG. 6 depicts a front view of a touch panel according to another embodiment of the present disclosure.
Figure 7:
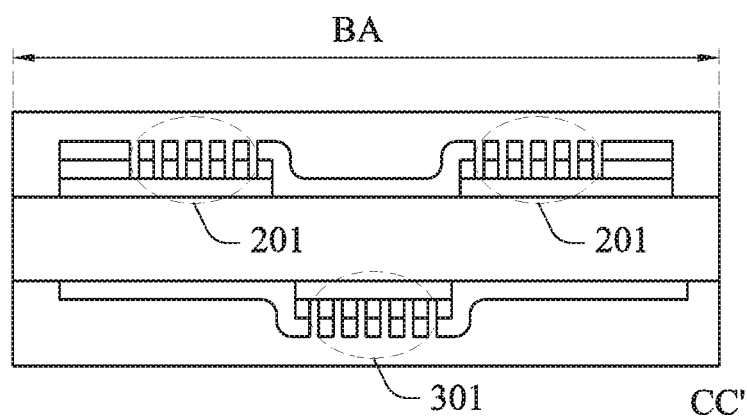
FIG. 7 depicts a cross-sectional view of line CC' of FIG. 6.

FIG. 6 depicts a front view of a touch panel 10' according to another embodiment of the present disclosure, and FIG. 7 depicts a cross-sectional view of line CC' of FIG. 6. The difference between the embodiment of FIG. 6 and FIG. 1 is that the first wire area 201 and the second wire area 301 are located in the bonding area BA, and a projection of the first wire area 201 in the vertical direction is not opposite to the second wire area 301. In other words, it can be seen from the two embodiments in FIG. 5 and FIG. 7 that, in the bonding area BA, one wire area can be opposite to another wire area or cannot be opposite to the other wire area.

Although a series of operations or steps are used below to describe the method disclosed herein, an order of these operations or steps should not be construed as a limitation to the present invention. For example, some operations or steps may be performed in a different order and/or other steps may be performed at the same time. In addition, all shown operations, steps and/or features are not required to be executed to implement an embodiment of the present invention. In addition, each operation or step described herein may include a plurality of sub-steps or actions.

Figure 8:
FIGS. 8-13 depict a cross-sectional view showing various process stages in the preparation method according an embodiment of the present disclosure.
Figure 9:
Figure 10:
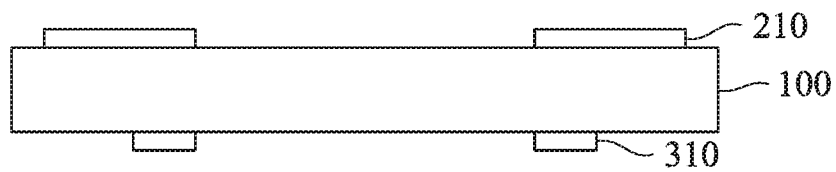
Figure 11:
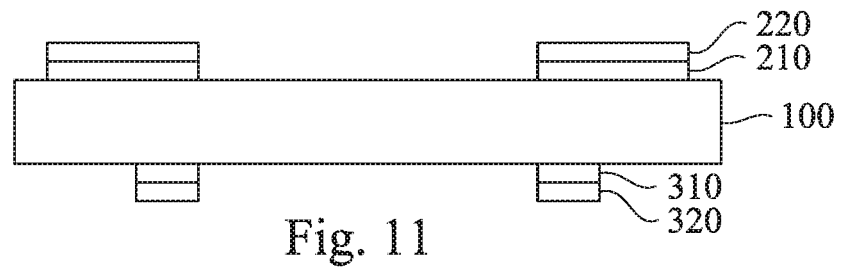
Figure 12:
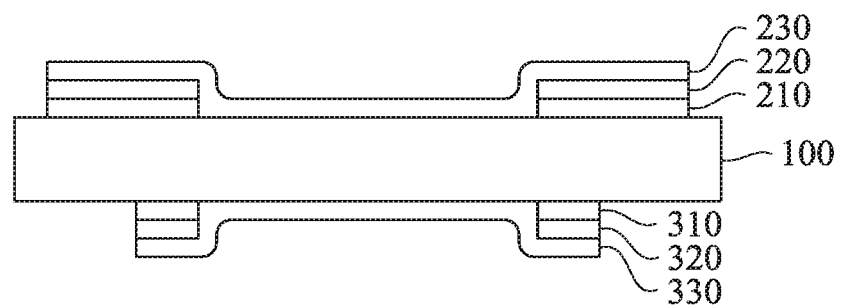
Figure 13:
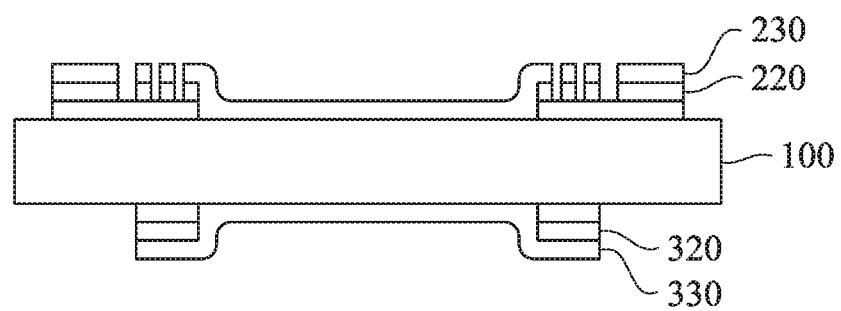

FIGS. 8-13 depict a cross-sectional view showing various process stages in the preparation method according an embodiment of the touch panel 10 in FIGS. 1-5 of the present disclosure, and sectional line AA' in FIG. 1 is taken as an example. As shown in FIG. 8, the substrate 100 was provided. Next, as shown in FIG. 9, the first catalyst layer 210 was printed on a metal trace area and a target position on an upper surface of the substrate 100, and then the first catalyst layer 210 was cured by ultraviolet (UV). Next, as shown in FIG. 10, the second catalyst layer 310 was printed on the metal trace area and the target position on the lower surface of the substrate 100, and then the second first catalyst layer 310 was cured by ultraviolet (UV). Next, as shown in FIG. 11, the substrate 100 with the first catalyst layer 210 and the second catalyst layer 310 was placed into a metallization plating bath while undergoing oxidation-reduction reactions, to form the first metal layer 220 and the second metal layer 320. Next, as shown in FIG. 12, nanosilver material was coated on the first metal layer 220 and the second metal layer 320, and then the nanosilver material was cured to form the first transparent conductive layer 230 and the second transparent conductive layer 330. Next, as shown in FIG. 13, the first metal layer 220 and the first transparent conductive layer 230 on the upper surface of the substrate 100, and the second metal layer 320 and the second transparent conductive layer 330 on the lower surface of the substrate 100, were patterned by an exposure lithography process.

Figure 14:
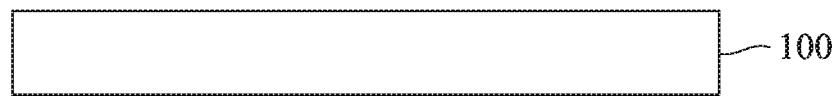
FIGS. 14-25 depict a cross-sectional view showing various process stages in the preparation method according another embodiment of the present disclosure.
Figure 15:
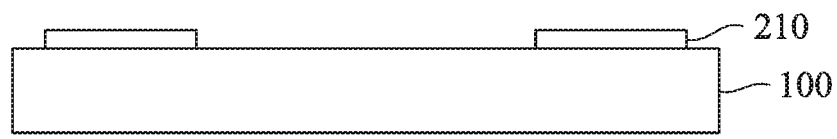
Figure 16:
Figure 17:
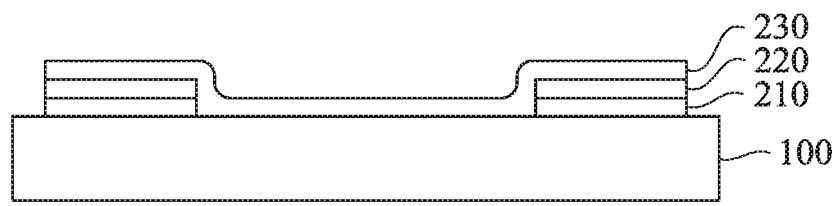
Figure 18:
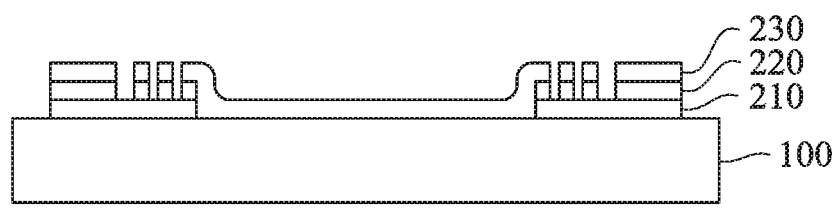
Figure 19:
Figure 20:
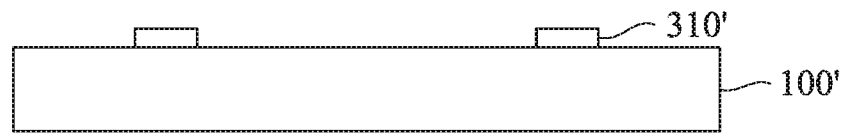
Figure 21:
Figure 22:
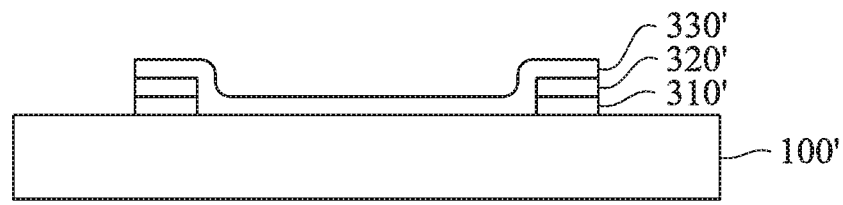
Figure 23:
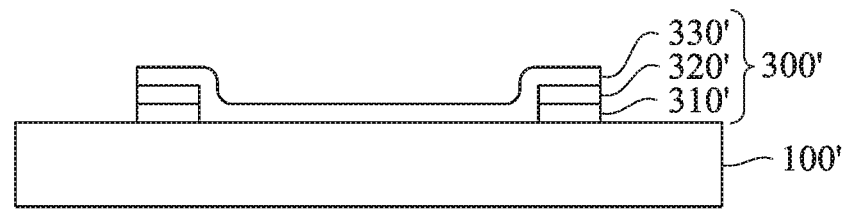
Figure 24:
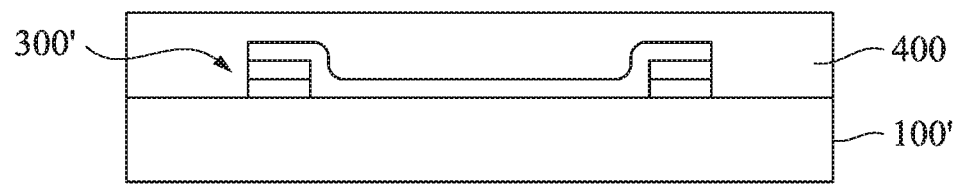
Figure 25:
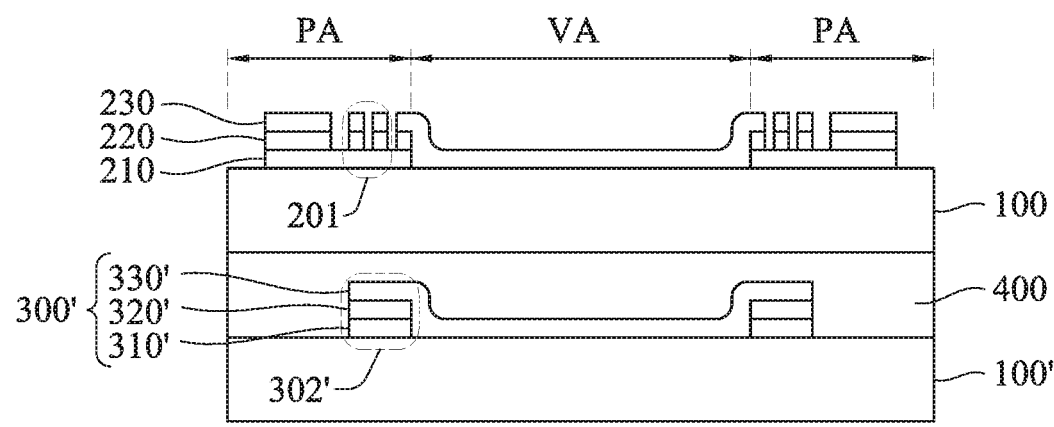

FIGS. 14-25 depict a cross-sectional view showing various process stages in the preparation method according another embodiment of the touch panel 10 of the present disclosure, and sectional line AA' similar to that in FIG. 1 is taken as an example. As shown in FIG. 14, the substrate 100 was provided. As shown in FIG. 15, the first catalyst layer 210 was printed on the metal trace area and the target position on an upper surface of the substrate 100, and then the first catalyst layer 210 was cured by ultraviolet. As shown in FIG. 16, the substrate 100 with the first catalyst layer 210 was placed into the metallization plating bath while undergoing oxidation-reduction reactions to form the first metal layer 220. As shown in FIG. 17, the nanosilver material was coated on the first metal layer 220, and then the nanosilver material was cured to form the first transparent conductive layer 230. Next, as shown in FIG. 18, the first metal layer 220 and the first transparent conductive layer 230 on the upper surface of the substrate 100 were patterned by the photolithographic process. As shown in FIG. 19, a substrate 100' was provided. As shown in FIG. 20, a second catalyst layer 310' was printed on the metal trace area and the target position on the upper surface of the substrate 100', and then the second catalyst layer 310' was cured by ultraviolet. Next, as shown in FIG. 21, the substrate 100' with the second catalyst layer 310' was placed into a metallization plating bath while undergoing oxidation-reduction reactions to form the second metal layer 320'. Next, as shown in FIG. 22, nanosilver material was coated on the second metal layer 320', and then the nanosilver material was cured to form the second transparent conductive layer 330'. Next, as shown in FIG. 23, the second metal layer 320' and the second transparent conductive layer 330' on the upper surface of the substrate 100' were patterned by the photolithographic process. Next, as shown in FIG. 24, an optical clear adhesive 400 (OCA) was coated on the second wire structure 300' and the substrate 100'. Next, as shown in FIG. 25, the structure of FIG. 18 was adhered to the structure of FIG. 24. Specifically, the substrate 100 includes the display area (or the first display area) VA and the peripheral area (or the first peripheral area) PA, and the substrate 100' (or the lower substrate) is disposed under the substrate 100. The substrate 100' includes a second display area and a second peripheral area (not shown). The second display area is surrounded by the second peripheral area. A projection of the second display area in the vertical direction is opposite to the first display area, and a projection of the second peripheral area in the vertical direction is opposite to the first peripheral area. The first catalyst layer 210 is disposed on the upper surface of the substrate 100, and the second catalyst layer 310' is disposed on the upper surface of the substrate 100', in which the projection of first wire area 201 in the vertical direction is opposite to the second ground line area 302'.

The touch panel of the present disclosure uses flexographic printing to print the catalytic layer on the substrate and then undergoes the plating process. The advantages include: 1. The original spraying target or paint on the entire surface is reduced at least 90%; 2. The touch panel of the present disclosure can be printed graphically, and the line width can be from a single line width of 2 µm to full-page printing; 3. Thinner products can be printed on the touch panel of the present disclosure to reduce the thickness of the stack and overlap; 4. It also improves the accuracy of the touch point by using the wire areas and grounding areas opposite to each other.

While the disclosure has been described by way of example(s) and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch panel, comprising:
   a substrate comprising a first display area and a first peripheral area, wherein the first display area is surrounded by the first peripheral area;
   a first wire structure comprising:
      a first catalyst layer disposed above the first peripheral area of the substrate;
      a first metal layer disposed above the first catalyst layer; and
      a first transparent conductive layer disposed above the first metal layer, wherein the first wire structure is divided into at least one first wire area and at least one first ground line area adjacent to the first wire area; and
   a second wire structure disposed beneath the first peripheral area of the substrate, the second wire structure comprising at least one second ground line area, wherein a projection of the first wire area in a vertical direction is opposite to the second ground line area.

2. The touch panel of claim 1, wherein:
   the first wire structure is divided into one first wire area and two first ground line areas, and
   the first wire area is between the two first ground line areas.

3. The touch panel of claim 1, wherein:
   the second wire structure further comprises:
      a second catalyst layer disposed beneath the first peripheral area of the substrate;
      a second metal layer disposed beneath the second catalyst layer; and
      a second transparent conductive layer disposed beneath the second metal layer, and
   the second wire structure is divided into at least one second wire area and at least one second ground line area adjacent to the second wire area.

4. The touch panel of claim 3, wherein a projection of the second wire area in the vertical direction is opposite to the first ground line area.

5. The touch panel of claim 3, wherein:
   the second wire structure is divided into one second wire area and two second ground line areas, and
   the second wire area is between the two second ground line areas.

6. The touch panel of claim 3, wherein the first catalyst layer and the second catalyst layer have different patterns.

7. The touch panel of claim 1, wherein:
the second wire structure further comprises:
a lower substrate disposed beneath the substrate, the lower substrate comprising a second display area and a second peripheral area, the second display area surrounded by the second peripheral area, a projection of the second display area in the vertical direction being opposite to the first display area, and a projection of the second peripheral area in the vertical direction being opposite to the first peripheral area;
a second catalyst layer disposed above the second peripheral area of the lower substrate;
a second metal layer disposed above the second catalyst layer; and
a second transparent conductive layer disposed above the second metal layer, and
the second wire structure is divided into at least one second wire area and at least one second ground line area adjacent to the second wire area.

8. The touch panel of claim 6, wherein a projection of the second wire area in the vertical direction is opposite to the first ground line area.

9. The touch panel of claim 6, wherein:
the second wire structure is divided into one second wire area and two second ground line areas, and
the second wire area is between the two second ground line areas.

10. The touch panel of claim 1, wherein:
the substrate further comprises a bonding area connected to a side on the first peripheral area, and
a projection of the first wire area in the vertical direction is opposite to a second wire area when the first wire area and the second wire area are located in the bonding area.

11. The touch panel of claim 1, wherein:
the substrate further comprises a bonding area connected to a side on the first peripheral area,
the second wire structure further comprises at least one second wire area, and
a projection of the first wire area in the vertical direction is not opposite to the second wire area when the first wire area and the second wire area are located in the bonding area.

12. The touch panel of claim 1, wherein the touch panel is prepared by full-plate printing or patterned printing process.

13. The touch panel of claim 1, wherein:
the substrate further comprises a bonding area,
the bonding area is disposed at a first side of the first display area,
the projection of the first wire area in the vertical direction is opposite to the second ground line area at a second side of the first display area, and
the second side is different from the first side.

14. The touch panel of claim 13, wherein the second side is perpendicular to the first side.

15. The touch panel of claim 1, wherein:
the projection of the first wire area in the vertical direction is opposite to the second ground line area at a first side of the first display area, a projection of the first ground line area in the vertical direction is opposite to the second ground line area at a second side of the first display area, and
the second side is different than the first side.

16. The touch panel of claim 15, wherein the second side is diametrically opposite to the first side.

17. A touch panel, comprising:
a substrate comprising a first display area, a first peripheral area, and a bonding area, wherein the first display area is surrounded by the first peripheral area;
a first wire structure comprising:
a first catalyst layer disposed above the first peripheral area of the substrate;
a first metal layer disposed above the first catalyst layer; and
a first transparent conductive layer disposed above the first metal layer, wherein the first wire structure is divided into at least one first wire area; and
a second wire structure disposed beneath the first peripheral area of the substrate, wherein:
the second wire structure comprises at least one second ground line area,
the bonding area is disposed at a first side of the first display area,
the first wire area overlies the second ground line area in the first peripheral area at a second side of the first display area,
the first wire area and the second ground line area are configured to conduct current in parallel directions where the first wire area overlies the second ground line area, and
the second side is different from the first side.

18. The touch panel of claim 17, wherein the second side is perpendicular to the first side.

19. A touch panel, comprising:
a substrate comprising a first display area and a first peripheral area, wherein the first display area is surrounded by the first peripheral area;
a first wire structure comprising:
a first metal layer disposed above the first peripheral area of the substrate; and
a first transparent conductive layer disposed above the first metal layer, wherein the first wire structure is divided into at least one first wire area and at least one first ground line area adjacent to the first wire area; and
a second wire structure disposed beneath the first peripheral area of the substrate, wherein:
the second wire structure comprises at least one second ground line area,
a projection of the first wire area in a vertical direction is opposite to the second ground line area at a first side of the first display area,
in the projection of the first wire area, a longest dimension of the first wire area is parallel to a longest dimension of the second ground line area,
a projection of the first ground line area in the vertical direction is opposite to the second ground line area at a second side of the first display area, and
the second side is different than the first side.

20. The touch panel of claim 19, wherein the second side is diametrically opposite to the first side.

* * * * *